US007071813B2

(12) United States Patent
Fitzgibbon

(10) Patent No.: US 7,071,813 B2
(45) Date of Patent: Jul. 4, 2006

(54) STATUS SIGNAL METHOD AND APPARATUS FOR MOVABLE BARRIER OPERATOR AND CORRESPONDING WIRELESS REMOTE CONTROL

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 225 days.

(21) Appl. No.: 10/447,661

(22) Filed: May 29, 2003

(65) Prior Publication Data

US 2004/0239482 A1 Dec. 2, 2004

(51) Int. Cl.

| | |
|---|---|
| ***B60R 25/00*** | (2006.01) |
| ***G05B 19/00*** | (2006.01) |
| ***G06F 7/00*** | (2006.01) |
| ***G08B 29/00*** | (2006.01) |
| ***H04B 1/00*** | (2006.01) |

(52) U.S. Cl. ........................ 340/5.71; 340/5.7; 340/5.6

(58) Field of Classification Search ............... 340/5.71, 340/5.7, 5.6, 3.32, 5.26, 686.1, 480, 445, 340/932.2, 938, 993; 342/359; 341/176; 49/25

See application file for complete search history.

(56) References Cited

U.S. PATENT DOCUMENTS

| | | | | |
|---|---|---|---|---|
| 5,990,828 | A | 11/1999 | King | |
| 6,002,332 | A | 12/1999 | King | |
| 6,049,289 | A * | 4/2000 | Waggamon et al. | 340/5.23 |
| 6,166,634 | A * | 12/2000 | Dean | 340/545.1 |
| 6,271,765 | B1 | 8/2001 | King et al. | |
| 6,331,817 | B1 * | 12/2001 | Goldberg | 340/573.1 |
| 6,388,559 | B1 * | 5/2002 | Cohen | 340/5.71 |
| 6,476,732 | B1 | 11/2002 | Stephan | |
| 6,593,856 | B1 * | 7/2003 | Madau | 340/825.69 |
| 6,597,291 | B1 | 7/2003 | Tsui | |
| 6,615,132 | B1 * | 9/2003 | Nagasaka et al. | 701/200 |
| 6,754,468 | B1 * | 6/2004 | Sieben et al. | 455/41.2 |
| 6,759,942 | B1 * | 7/2004 | Bedi et al. | 340/5.72 |
| 2003/0029579 | A1 | 2/2003 | Mays | |
| 2003/0112121 | A1 | 6/2003 | Wilson | |

FOREIGN PATENT DOCUMENTS

JP 2001152749 A 11/1999

OTHER PUBLICATIONS

English abstract for Japanese Patent 2001152749A.

British Search Report for British patent a application GB0412063.0 dated Oct. 4, 2004.

* cited by examiner

*Primary Examiner*—Michael Horabik
*Assistant Examiner*—Nam Nguyen
(74) *Attorney, Agent, or Firm*—Fitch, Even, Tabin & Flannery

(57) ABSTRACT

A movable barrier operator (11) transmits status signals from time to time to reflect its own operational states. A corresponding wireless remote control apparatus (14) receives such status signals and used the informational content of such status signals to effect a variety of automatic and/or user-facilitated control strategies. In one embodiment, the wireless remote control apparatus can use the status signal to determine a distance (or at least an approximate distance) between the movable barrier operator and the wireless remote control apparatus. This distance information, in turn, can also be used to inform and enrich the control strategies and possibilities of the wireless remote control apparatus.

71 Claims, 8 Drawing Sheets

STATUS SIGNAL METHOD AND APPARATUS FOR MOVABLE BARRIER OPERATOR AND CORRESPONDING WIRELESS REMOTE CONTROL

TECHNICAL FIELD

This invention relates generally to movable barrier operators and to wireless remote control apparatus as used therewith.

BACKGROUND

Movable barriers of various kinds are known in the art, including but not limited to horizontally and vertically sliding barriers, vertically and horizontally pivoting barriers, single-piece barriers, multi-piece or segmented barriers, partial barriers, complete barriers, rolling shutters, and various combinations and permutations of the above. Such barriers are typically used to control physical and/or visual access to or via an entryway (or exit) such as, for example, a doorway to a building or an entry point for a garage.

In many cases, a motor or other motion-imparting mechanism is utilized to effect selective movement of such a movable barrier. A movable barrier operator will then usually be utilized to permit control of the motion-imparting mechanism. In some cases a user may control the movable barrier operator by assertion of one or more control surfaces that are physically associated with the movable barrier operator. In other cases such control can be effected by the transmission of a wireless remote control signal to the movable barrier operator.

A wireless remote control apparatus typically serves to source selective transmission of such a wireless remote control signal to a corresponding movable barrier operator. To facilitate this, the movable barrier operator will typically be provided with a compatible receiver. So configured, a not un-typical prior art movable barrier operator system will comprise a system that utilizes a one-way wireless communication link.

Movable barrier operator systems have been proposed or exist that include a two-way wireless communication capability in order to permit control signaling to be sourced from the movable barrier operator. For example, it has been proposed that a movable barrier operator can transmit a command signal that comprises a query command signal. A corresponding wireless remote control apparatus that receives this query command signal will then respond to the query command by transmitting an acknowledgement signal. So configured, the movable barrier operator can then conduct or modify its own functionality and actions to take into account the proximal presence of the wireless remote control apparatus.

Unfortunately, the various known movable barrier operator systems are not wholly satisfactory to accommodate the potential needs of all desired applications. As one example, pursuant to these various teachings, the wireless remote control apparatus typically comprises a relatively simplistic remote interface to the movable barrier operator itself. In general, although a command signal can be transmitted by a remotely position user via such a wireless remote control apparatus, overall command of the movable barrier resides with the movable barrier operator itself. Such centralization can lead to communication disconnects. As one simple illustration, a user of a wireless remote control apparatus can press an "open" button on the apparatus when intending to cause a corresponding movable barrier to move to an opened position. When performing this action while the wireless remote control apparatus is yet out of range, however, the movable barrier operator will not receive the wireless command signal, the movable barrier will not change state, and the user will have to reassert the "open" button upon confirming in some fashion that the previous instruction was not effective.

BRIEF DESCRIPTION OF THE DRAWINGS

The above needs are at least partially met through provision of the status signal method and apparatus for movable barrier operator and corresponding wireless remote control described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a movable barrier operator automatically wirelessly transmits a status signal regarding at least a first movable barrier operator operating state. This status signal merely provides information regarding the corresponding operating state and does not, in and of itself, constitute a command signal. So configured, the movable barrier operator in a preferred embodiment may transmit the status signal without any corresponding expectation of a responsive action from any receiving device.

Pursuant to a preferred embodiment, a wireless remote control apparatus that receives the status signal can utilize the informational content of that signal to facilitate a variety of automatic responses, including the automatic transmission of a predetermined command signal (to, for example, the movable barrier operator) or the prompting of a user in a predetermined fashion, to name a few. The movable barrier operator can of course respond to any command signals as sourced by the wireless remote control apparatus (regardless of whether the wireless remote control apparatus sources such signals automatically or in response to a subsequent user response) in an ordinary fashion.

So configured, a wireless remote control apparatus can play a more active role in the control and decision-making processes regarding the movable barrier by combining appropriate use of the movable barrier operator status information with the innate ability of the wireless remote control apparatus to source one or more command signals. These processes can include either or both the making of automatic decisions regarding command instructions to be transmitted and the provision of information to a user to thereby prompt the user's instructional input. These capabilities in turn permit both potentially expedient and effective ways to accomplish previously supported functionality as well as to also support previously unavailable functionality as well.

Figure 1:
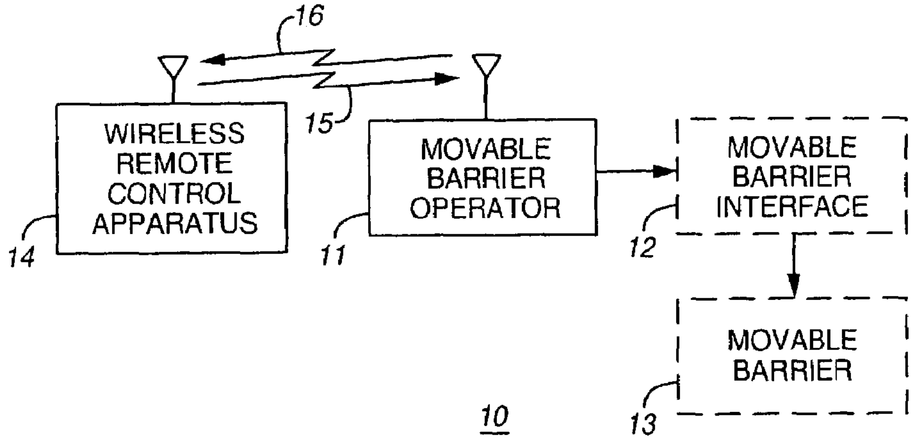
FIG. 1 comprises a block diagram as configured in accordance with a system embodiment of the invention.

Referring now to FIG. 1, an exemplary movable barrier operator system 10 includes a movable barrier operator 11 that operably couples to a movable barrier 13 via an appropriate movable barrier interface 12. The movable barrier operator 11 will preferably comprise a programmable platform and will include a microprocessor, micro-controller, programmable gate array, or the like (though fixed and/or otherwise more highly dedicated platforms will also suffice if desired). In a typical configuration, the movable barrier operator 11 will receive and respond to appropriate wireless remote control commands 15 as sourced by a corresponding wireless remote control apparatus 14. The latter usually (but not always or necessarily) comprises a portable device having one or more buttons, switches, or other user interface mechanisms to permit a user to cause transmission of a particular command to the movable barrier operator 11. Such components and their ordinary inter-workings are well known in the art and additional detailed description need not be provided here.

The movable barrier operator 11 can have a plurality of potential operating states or conditions. For example, the movable barrier operator 11 can have a state that corresponds to one or more of the following:

The movable barrier 13 is in a fully opened position;

The movable barrier 13 is in a fully closed position;

The movable barrier 13 is moving towards one of the above positions;

The movable barrier 13 is presently at a particular position between the opened and closed positions;

An obstacle in the path of the movable barrier 13 has been detected (as can be ascertained, for example, when a movable barrier operator 11 that is equipped with a photo-beam-based obstacle detector detects a broken photo-beam condition);

Movement of the movable barrier 13 has been reversed;

The movable barrier operator 11 is presently in a normal operating mode;

The movable barrier operator 11 is presently in a particular selected operating mode other than a normal operating mode (such as, for example, a learning mode of operation (during which the movable barrier operator 11 can determine, for example, characteristics amount of force that are required or potentially required to move the movable barrier from a first position to a second position) or a vacation mode of operation);

The movable barrier operator 11 has switched on (or off) one or more lights that are under its control;

That one or more wireless remote control apparatus are located proximal to the movable barrier operator; and A number of times within a preceding predetermined period of time the movable barrier operator 11 has caused the movable barrier 13 to move. These examples are intended to be illustrative only and should not be viewed as an all-inclusive listing. In fact, it should be clear that the teachings set forth below are applicable with a considerably greater number of potential operating states for a given movable barrier operator 11.

In a preferred embodiment, the movable barrier operator 11 automatically transmits status signals 16 that include informational content regarding one or more of its operating states. In a preferred embodiment these status signals 16 will correspond to a present (or imminent) operating state. Pursuant to one approach, these status signals can be transmitted from time to time pursuant to, for example, a pre-determined schedule. Pursuant to another approach, these transmissions can be event-driven. So configured, status signal transmissions will be sourced when a change to the operating state of the movable barrier operator 11 occurs. Pursuant to yet another approach, one can combine the above two mechanisms. So configured, a status signal will be sourced to correspond to at least some changes to the operating state and, regardless of whether any such changes occur within a given period of time, a status signal can also be sourced pursuant to some predetermined schedule (for example, a status signal can be automatically transmitted once every 0.5 seconds, every 5 seconds, every 5 minutes, and so forth as desired and/or as appropriate to a given application).

These status signals 16 themselves can be configured to conform to any appropriate or desired signaling protocol. For example, one or more data words can be used that are each comprised of a plurality of fields, with each field corresponding to a given predetermined operational mode (for example, one field can represent the moving or non-moving state of the movable barrier while another field can represent the operational presence or absence of an obstacle detector). Pursuant to another approach, an operating state identifier field can be used with a corresponding status condition indicator. By this approach, each status signal 16 would not necessarily provide information regarding all (or even many) potential operating states. Instead, only states that are deemed relevant (but whatever criteria may be appropriate to the needs of the application) would be included. Again, such examples are intended to be illustrative only. Signaling and data formats and protocols are many and varied and are further generally well understood in the art. These teachings may be exercised compatibly with many presently known (and likely many yet-to-be-developed) signaling practices.

It is also possible to combine the status signal 16 with other information including, for example, a unique identifier that corresponds to the movable barrier operator 11 and/or that corresponds to a particular intended recipient device. Such codes can be relatively static and fixed or can vary dynamically, again as well understood in the art.

Figure 2:
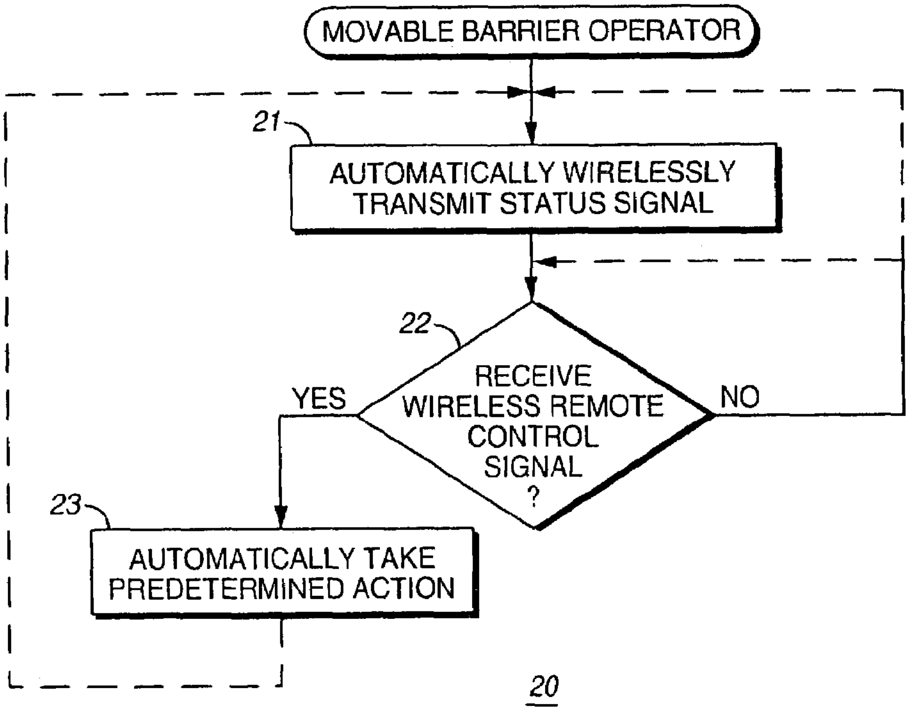
FIG. 2 comprises flow diagram for a movable barrier operator as configured in accordance with an embodiment of the invention.

With reference to FIG. 2, such a movable barrier operator 11 can serve to facilitate a process 20 such that the movable barrier operator 11 automatically wirelessly transmits one or more status signals 21 as noted above. The process 20 then permits subsequent reception of wireless remote control signals 22 from, for example, a corresponding wireless remote control apparatus 14 and the taking of an automatic predetermined action 23 in response thereto. When a wireless remote control signal does not include an appropriate required identifier for the movable barrier operator 11, the transmitting wireless remote control apparatus 14, or both, of course, the corresponding command can be ignored in accordance with well understood practice.

As will be shown below, in a preferred embodiment, the received wireless remote control signal can include a command that, when effected by the movable barrier operator 11, will cause a change to the operating state of the movable barrier operator 11. When this occurs, the process 20 can effect a subsequent automatic transmission of a status signal to reflect this changed status condition.

In effect, the movable barrier operator 11 generally functions in an ordinary fashion with the exception that status signals are transmitted from time to time to reflect current or imminent operating states of the movable barrier operator 11.

Figure 3:
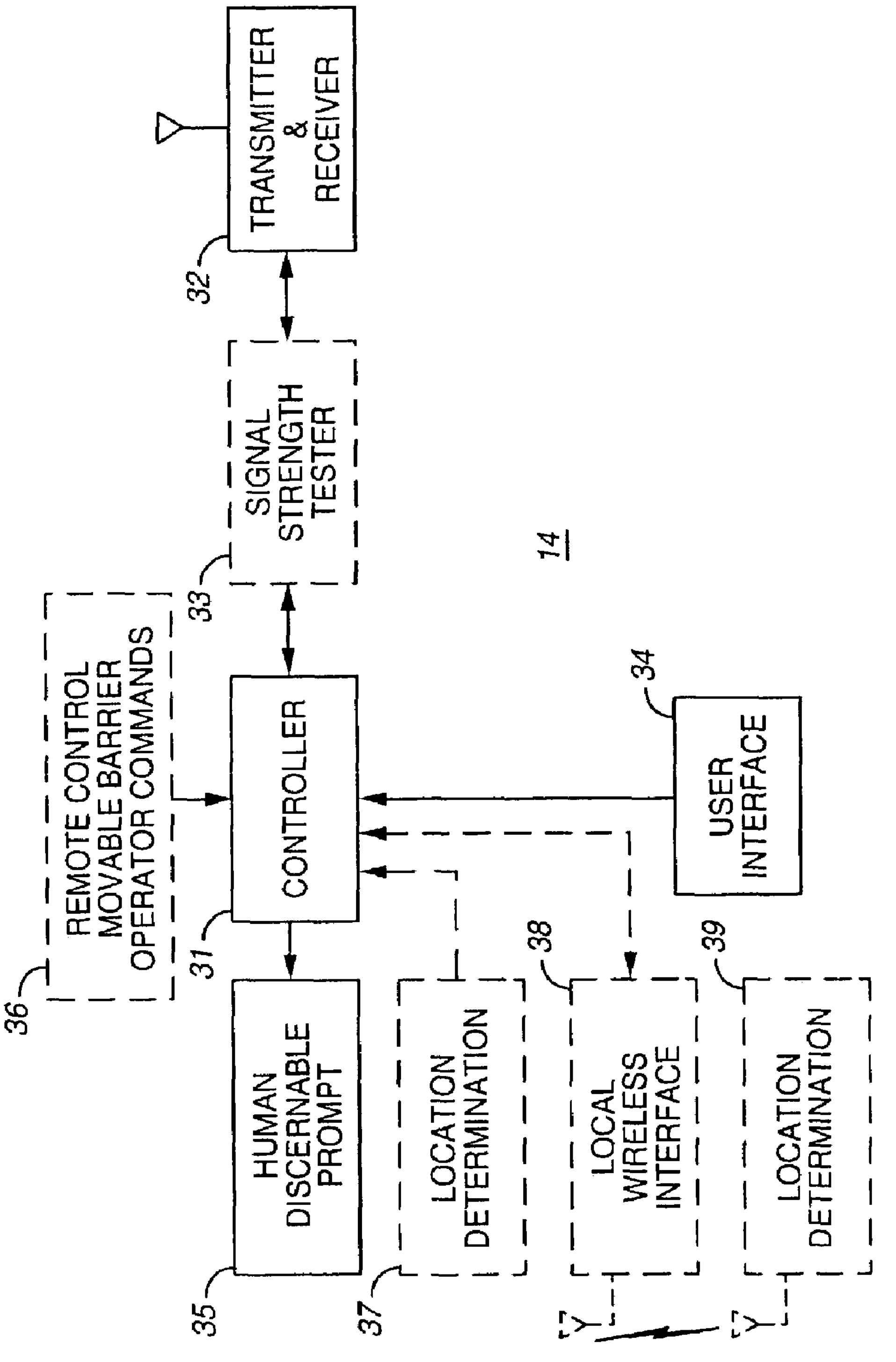
FIG. 3 comprises a block diagram of a wireless remote control apparatus as configured in accordance with various embodiments of the invention.

Referring now to FIG. 3, an illustrative wireless remote control apparatus 14 suitable for use with the availability of such status signals includes a controller 31 that operably couples to a receiver/transmitter 32. This capability can be realized through provision of an integrated transceiver or by use of separate transmitter and receiver sections as well understood in the art (separate platforms may be preferable when the transmission and reception channels are considerably different from one another with respect to carrier medium, channel width, modulation type, and/or any number of other channel characterizations. For purposes that will be made more clear below, it may also be desirable to include an optional signal strength tester 33 (either as a discrete capability as suggested by the depiction or as integrated into one or more of the other constituent components of the wireless remote control apparatus 14).

In this embodiment, the wireless remote control apparatus 14 also preferably includes a user interface 34. This user interface 34 will typically include one or more user manipulable surfaces (such as a push button, a sliding switch, or some other touch-sensitive surface or body) to permit a user to indicate desired actions to be effected by the wireless remote control apparatus 13 and/or the movable barrier operator 11. It is also possible to provide other kinds of user interfaces, either in lieu of one or more manipulable surfaces or in combination therewith. For example, the user interface 34 can include or can comprise an appropriate audio transducer and a speech recognition engine (which speech recognition engine can be speaker dependent and/or speaker independent as is generally well understood in the art). So configured, a user can provide spoken instructions or queries to the wireless remote control apparatus 14 via the user interface 34 without otherwise physically contacting the wireless remote control apparatus 14. The remote control wireless apparatus 14 can then use speech recognition techniques to ascertain the informational content of the user's verbalized instructions and then take appropriate corresponding action or actions. (Speech recognition is well understood in the art For additional details regarding implementing a speech recognition capability in conjunction with a wireless remote control apparatus, see "Barrier Movement System Including a Combined Keypad and Voice Responsive Transmitter" having application Ser. No. 09/915,080 and having been filed on Jul. 25, 2001, the contents of which are incorporated herein by this reference.)

This embodiment will also preferably include a human discernable prompt 35. This human discernable prompt 35 can be any of the following, alone or in combination (wherein the following listing should be viewed as being illustrative and not as an all-inclusive listing of all possible prompts):

A single discrete visual indicator, such as a light emitting diode;

Multiple discrete visual indicators, such as a plurality of light emitting diodes or a single diode having a plurality of display capabilities (such as a multi-color diode);

A graphic display that selectively presents icons or other representative imagery;

An alphanumeric display that selectively presents textual-style informational content;

An animated display that selectively presents animated imagery;

A single audio tone that corresponds, for example, to a particular reported condition;

A plurality of discrete audio tones that each, alone or in various combinations, correspond to various reported conditions; and Synthesized or otherwise retrieved speech that articulates information content to be conveyed to a user in a spoken fashion.

Lastly, in at least one embodiment, the wireless remote control apparatus 14 also includes one or more predetermined remote control movable barrier operator commands. Some or all of these commands can be retained within the controller 31 itself (presuming availability of sufficient resident memory to accommodate these commands) or exterior to the controller 31 (for example, in one or more discrete memory units 36 as optionally suggested by the depiction in FIG. 3).

So configured, the wireless remote control apparatus 14 can source command signal transmissions in accordance with ordinary prior art technique. For example, when a user wishes to remotely cause a given movable barrier to move to an opened position, the operator can assert the corresponding element of the user interface 34 that corresponds with that desired action to cause the transmission of an appropriate corresponding command signal from the transmitter 32 to the movable barrier operator 11. Such a wireless remote control apparatus 14 can also serve, however, to receive status signals from the movable barrier operator 11 via the receiver 32 and to process such information accordingly.

Figure 4:
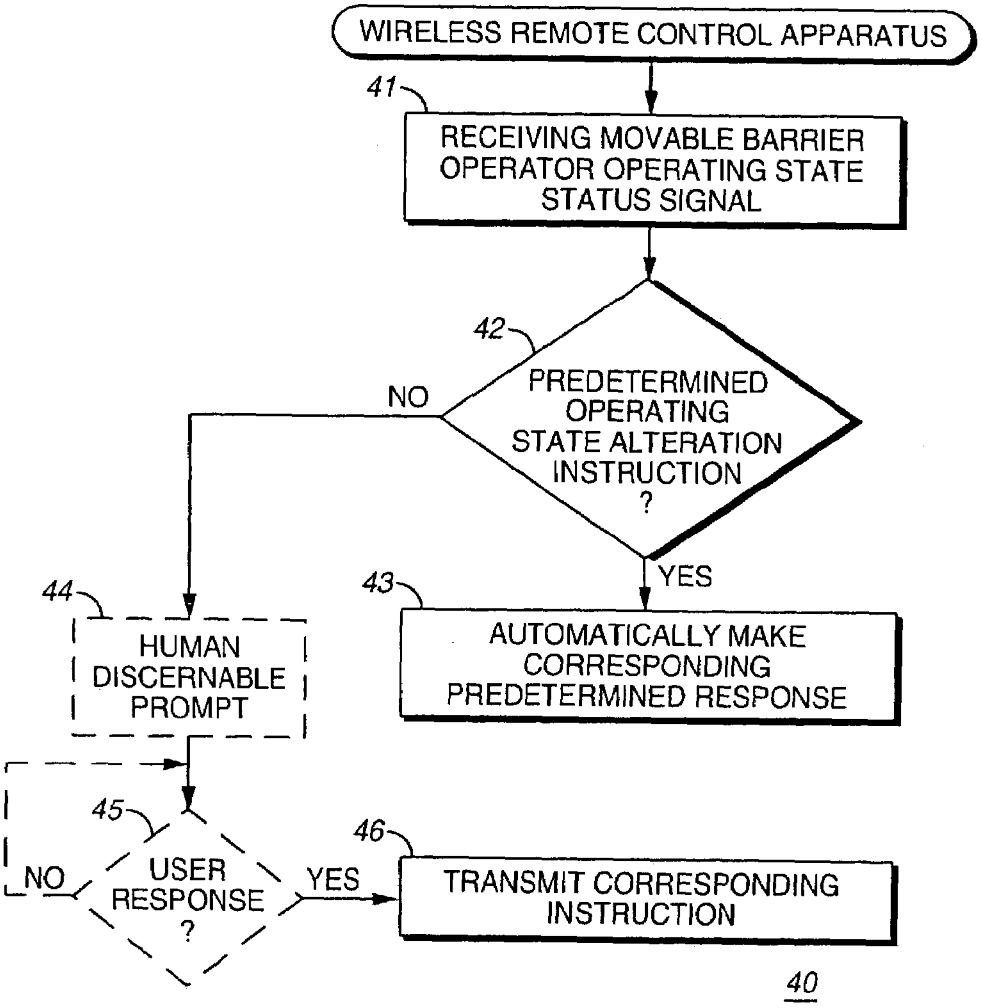
FIG. 4 comprises a flow diagram for a wireless remote control apparatus as configured in accordance with various embodiments of the invention.

For example, and referring now to FIG. 4, the wireless remote control apparatus 14 can effect a process 40 wherein the apparatus 14 receives 41 a status signal from a movable barrier operator that reflects an operating state of that movable barrier operator and then determines 42 whether a predetermined operating status alteration instruction exists for that operating state (as noted above, the wireless remote control apparatus 14 can be configured to first determine whether a received status signal includes a correct or expected identifier for the transmitting source, for the wireless remote control apparatus itself, or both prior to determining 42 whether a predetermined operating status alteration instruction exists for the otherwise indicated operating state). For example, the process 40 can determine whether a stored remote control movable barrier operator command has been correlated with the operating state represented by the status signal.

When true, the process 40 can cause the making 43 of an automatic predetermined response. For example, the process 40 can cause the automatic transmission of a stored remote control movable barrier operator command that has been previously associated with the operating state represented by the status signal. As another example, the process 40 can automatically disassociate an alteration instruction from the received status signal subsequent to automatically transmitting a remote control moveable barrier operator operating state alteration instruction (that is, the process 40 can automatically undue a previously devised correlation between a particular status signal and a particular pre-stored command to thereby render the correlation a temporary one). Other illustrative predetermined responses will be described with reference to FIG. 5 further below, following a description of an additional embodiment that is pertinent to FIG. 4.

As described above, the wireless remote control apparatus 14 can have a human discernable prompt 35. Such a human discernable prompt can of course be used to provide information to a user regarding automated actions that the process 40 initiates. So configured, the wireless remote control apparatus 14 can serve to receive a wireless movable barrier operator status condition signal and to provide, in response to such reception, a human discernable prompt that reflects the content of the status condition signal.

In addition, however, in such an embodiment, when no pre-existing automatic response to the status condition exists, the described process 40 can optionally drive the provision 44 of a human discernable prompt. Using indicia of choice, this human discernable prompt will preferably represent, at least in part, a present status of the movable barrier operator 11 as corresponds to the informational content of the received status signal. The process 40 can then determine 45 wherein the user responds to the prompt (via, for example, the user interface 34 described above). When and if the user responds with a particular command intended for the movable barrier operator 11, the process 40 can then effect such transmission 46. Illustrative examples that demonstrate and exploit such capability are presented further below.

Figure 5:
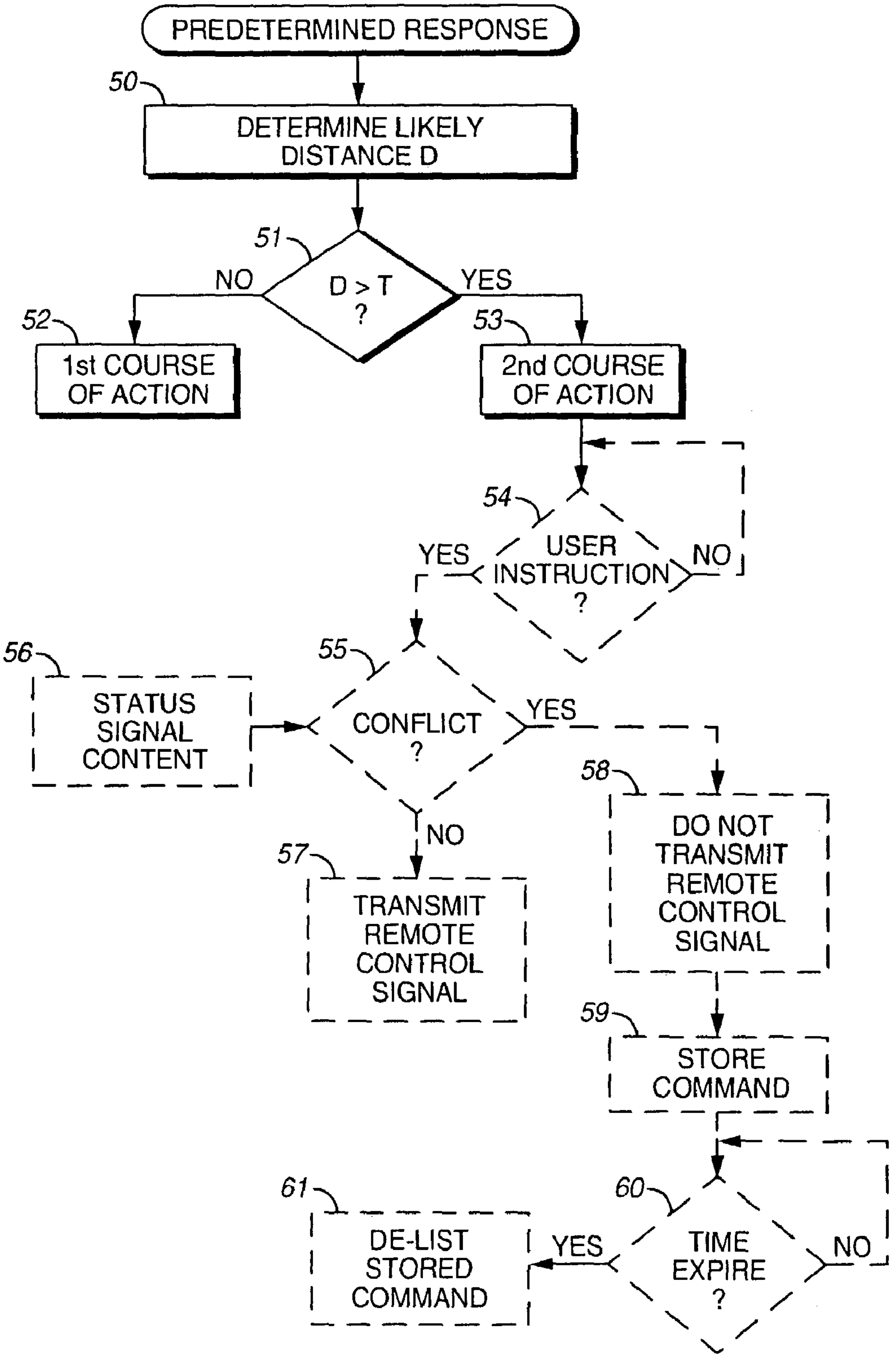
FIG. 5 comprises a detail flow diagram for a wireless remote control apparatus as configured in accordance with various embodiments of the invention.
Figure 6:
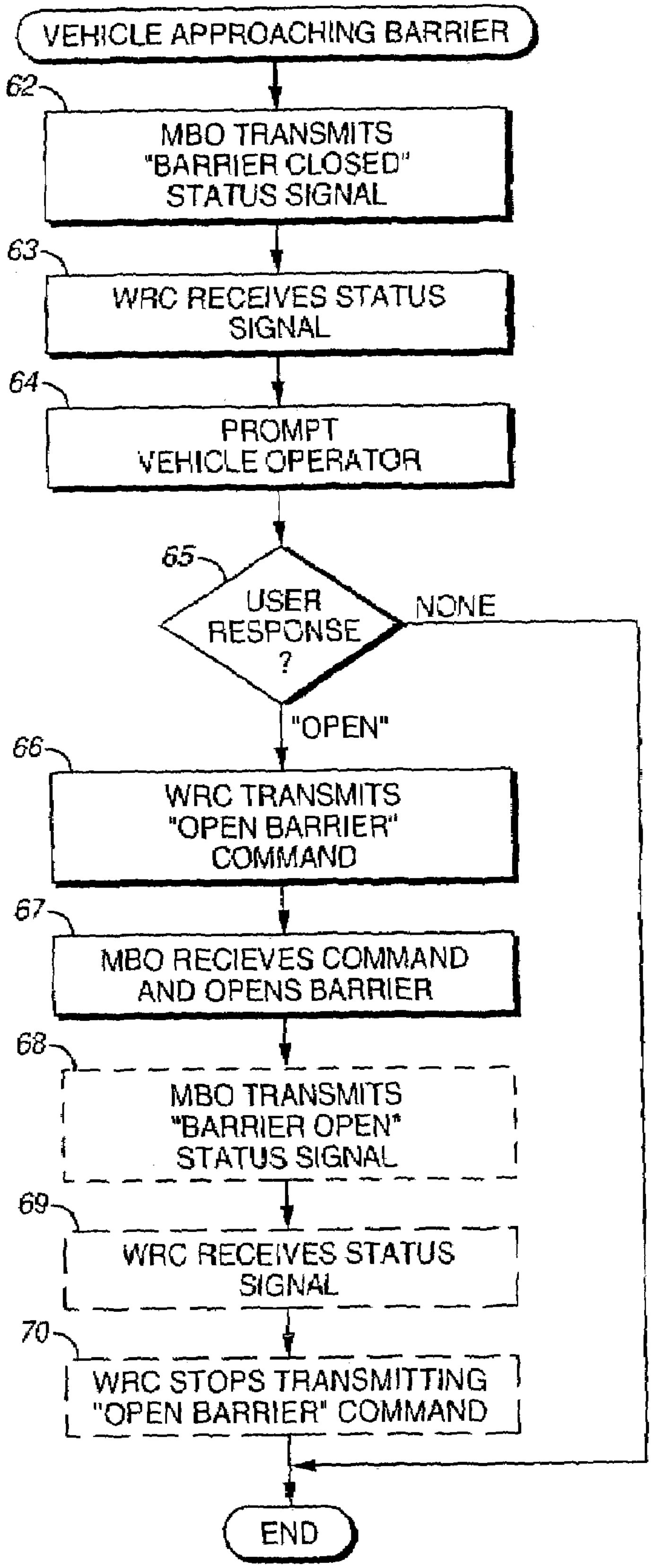
FIG. 6 depicts various illustrative examples.

As noted above, the wireless remote control apparatus 14 can determine what, if any, automatic response is appropriate to take upon receiving a status signal from a movable barrier operator 11. Referring now to FIG. 5, various alternative embodiments for such a predetermined response will be described.

Pursuant to these various alternative embodiments, upon receiving a status signal the predetermined response will include a determination 50 regarding a likely distance D that separates the wireless remote control apparatus 14 from the movable barrier operator 11 that transmitted the status signal. This can be done in various ways, including by assessing a parameter that likely corresponds to this particular interval. For example, this parameter could be based upon a measurement of the signal strength of the status signal (it will be recalled that, in one embodiment of the wireless remote control apparatus 14 included a signal strength tester 33). Properly calibrated in accordance with well-understood prior art technique, at least an approximate distance between transmitter and receiver can be determined in this fashion. Or, when the status signal includes data such as binary data, the parameter can be based upon a measured bit error rate of the status signal (where again the bit error rate can be correlated to an approximate distance between the transmission source and the receiver). Other techniques could be employed as well and as appropriate to a given application to use the status signal to determine a likely distance between the movable barrier operator 11 and the wireless remote control apparatus 14.

When the process determines 51 that this distance D does not exceed some predetermined threshold T, a first course of action is taken 52. For example, the threshold T may represent a relatively short distance, and the first course of action might comprise the making of no automatic transmissions to the movable barrier operator 11. So configured, for example, while the wireless remote control apparatus 14 might be otherwise programmed and inclined to automatically issue a "close" command upon receiving a status signal that indicates a particular operating state, upon determining that the wireless remote control apparatus 14 is relatively close to the movable barrier operator 11 (for example, the remote device is in a vehicle that is parked in a garage that also houses the movable barrier operator) it may be more appropriate to not transmit the "close" command when such proximity exists.

When the apparent distance D exceeds the threshold T of interest, however, a second course of action can be taken 53. For example, as already described above, the process can effect the appropriate selection of one or more corresponding commands and the automatic transmission of such commands to the movable barrier operator 11. This second course of action can also comprise, however, the automatic provision of a prompt to a proximally located user. Various subsequent actions and steps can then be optionally taken as appropriate or desired.

For example, the process can monitor for entry of a user instruction 54 (and particularly so when the preceding step comprises the provision of a prompt to the user). If the user does enter a response, the process can then optionally determine whether that response conflicts 55 with the content of the status signal 56. When no conflict exists, the requested command, such as a request to transmit a particular remote control signal, can be effected 57. When a conflict exists, however, this process facilitates taking an action other than the action requested by the user. As one simple illustration, the user may have entered an instruction that the movable barrier be moved to a closed position. The wireless remote control apparatus 14 may determine from a status signal, however, that the movable barrier operator 11 has detected an obstacle in the path of the movable barrier. The command to close the barrier therefore conflicts with the content of the status signal, and pursuant to this process, the wireless remote control apparatus 14 can determine 58 to not accept the command (for example, by not transmitting the requested remote control signal).

As another option, when the process determines to not observe a user command due to a substantive conflict with the content of a status signal, the process can nevertheless store 59 that command in, for example, a memory. When a new status signal arrives, the process can then have that stored command available (for example, as a queued second course of action 53) such that, if the previously identified conflict has cleared, the stored command can will then be implemented by the wireless remote control apparatus 14. It is possible, of course, that some stored commands may eventually be stale if not acted upon within some relevant period of time. To address such a concern, the process can also optionally provide for a watchdog timer 60. So configured, if a predetermined period of time (such as 5 seconds, 5 minutes, 5 hours, or any other period of time as may be suitable under a given set of conditions) expires without the sensed conflict having cleared, the previously stored command can be removed from storage by, for example, delisting the command from a list of pending second course of action items 53.

Such distance information as determined by the wireless remote control apparatus 14 can be used in other ways too, of course. For example, after using the status signal to determine proximity of the wireless remote control apparatus 14 to the movable barrier operator 11, the wireless remote control apparatus 14 can transmit a wireless remote control signal to the movable barrier operator 11 that includes information regarding such proximity. Such information can be general in nature (such as a signal that simply represents the wireless remote control apparatus 14 as being "close" or "not close") or specific (such as a calculated distance in, for example, meters). The movable barrier operator 11 could then use such information to better inform its own actions and tasks.

The above embodiments can serve in various ways to permit and facilitate a wide variety of useful actions with respect to the ultimate behavior of the movable barrier operator 11. A number of illustrative examples will now be provided (again, it should be clearly understood that these examples are illustrative in general of the powerful enabling capacity of these various embodiments and are not to be viewed as being an exhaustive listing of all possible uses).

EXAMPLE 1

A movable barrier operator ("MBO") within a garage transmits 62 a "barrier closed" status signal that includes information to indicate that the movable barrier associated with the garage is closed. As a vehicle approaching the garage comes within reception range of the transmissions of the movable barrier operator, a wireless remote control apparatus ("WRC") within the vehicle will receive 63 the status signal being broadcast by the movable barrier operator. The wireless remote control apparatus then prompts 64 the vehicle operator by providing a display indicating the closed condition of the garage and then awaits 65 a possible response by the vehicle operator. In this example, the vehicle operator responds by asserting an "open" command (for example, by speaking the word "open" when the wireless remote control apparatus has a speech recognition capability) and the wireless remote control apparatus responds by transmitting 66 an "open barrier" command. The movable barrier operator receives 67 this command and begins to open the movable barrier. Either as such movement is occurring or at the completion of such movement, as desired, the movable barrier operator then transmits 68 a new status signal to indicate its "barrier open" operational status. The wireless remote control apparatus will receive 69 this status signal and automatically take a corresponding action; in this example, the cessation 70 of its "open barrier" commands to the movable barrier operator.

Pursuant to such an approach, the vehicle operator is provided with a helpful prompt to call his or her attention to the fact that the garage is presently closed. Furthermore, the vehicle operator need only assert an open command a single time, regardless of whether the movable barrier operator is within reception range of the transmissions of the wireless remote control apparatus, as the latter will continue to transmit this command until it determines that the command has been effective.

EXAMPLE 2

Figure 7:
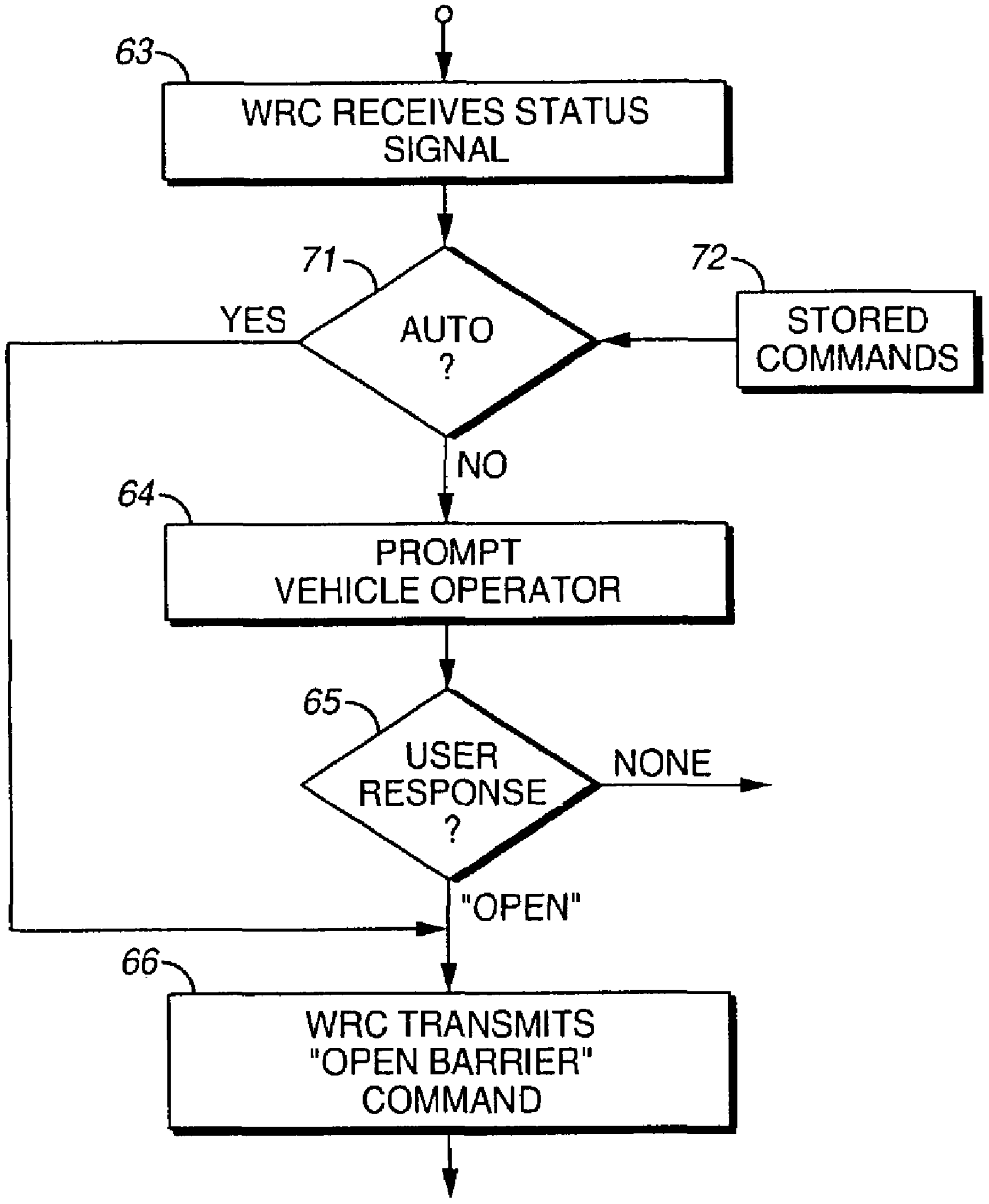
FIG. 7 depicts yet another illustrative example.

In example 1, the wireless remote control apparatus did not have any previously stored commands to automatically initiate upon receipt of the "barrier closed" status signal from the movable barrier operator. As per the embodiments set forth above, however, a manufacturer, installer, or user could correlate an "open barrier" command with a first receipt of a "barrier closed" status signal after having been out of range of any status signals (such as would occur when a vehicle is driven away from the garage to facilitate the vehicle operator's commute). The example presented above would then be modified as shown in relevant portion in FIG. 7, wherein the process would determine 71 whether the received status signal correlated to any stored commands 72. When such a correlation exists, the vehicle operator prompt 64 could be skipped and the wireless remote control apparatus could simply divert its process to effect an automatic transmission of the "open barrier" command as correlated to the "barrier closed" status signal under the operating circumstances and conditions of this example.

EXAMPLE 3

Figure 8:
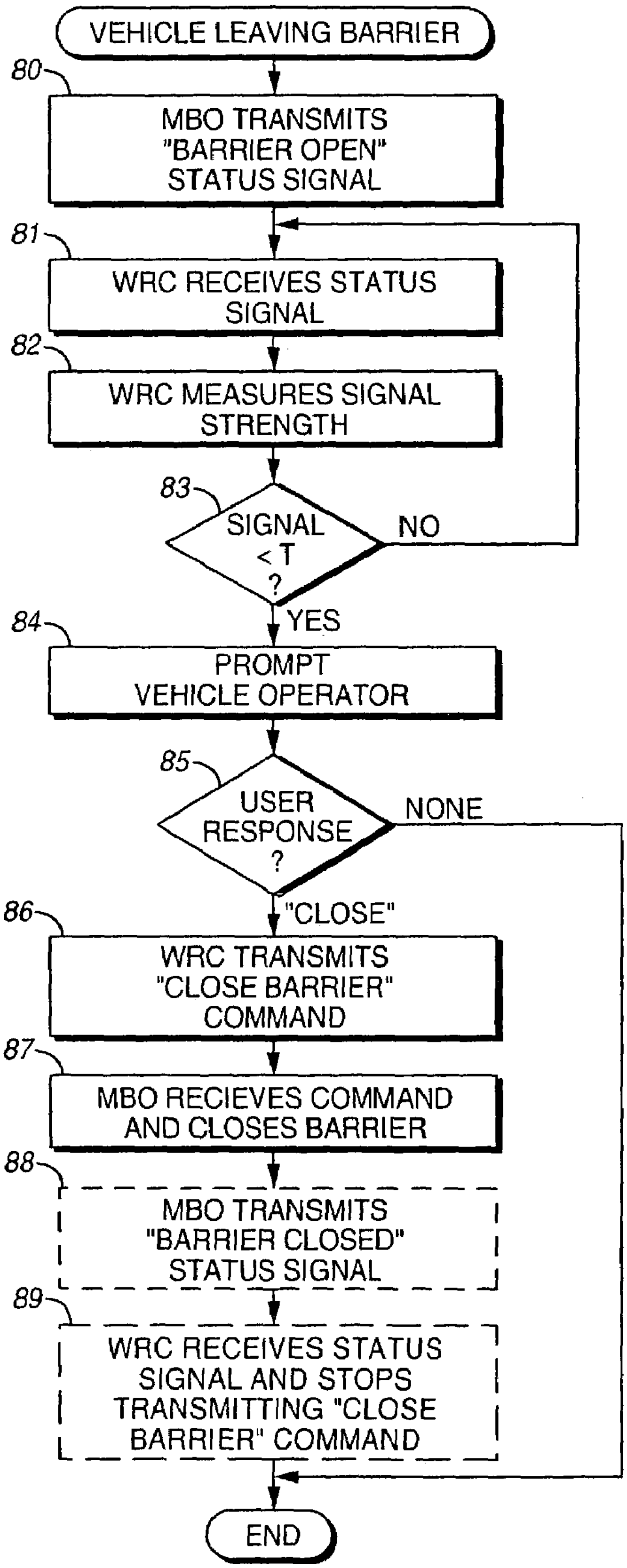
FIG. 8 depicts various illustrative examples.

In another illustrative example (and referring now to FIG. 8), a vehicle is leaving a garage having a movable barrier controlled by a movable barrier operator. As the movable barrier operator transmits 80 a "barrier open" status signal, the wireless remote control apparatus in the vehicle receives 81 the status signal and measures 82 the received signal strength thereof. The wireless remote control operator then determines 83 whether is measured signal strength is less than a predetermined threshold (hence indicating that the vehicle has moved more than a predetermined distance away from the movable barrier operator). When true, the wireless remote control apparatus then prompts 84 the vehicle operator to inform the vehicle operator of this circumstance (i.e., that the vehicle has moved a particular distance away from the garage and that the garage is still open and accessible).

Presuming for the sake of this example that the vehicle operator then enters 85 a "close barrier" command, the wireless remote control apparatus transmits 86 the requested command. The movable barrier operator receives 87 this command and closes the barrier. The movable barrier operator, having changed its operational status by compliance with the previous command, then transmits 88 an updated status signal indicated its "barrier closed" status. Upon receiving 89 this updated status signal, the wireless remote control apparatus can then cease transmitting the "close barrier" command.

EXAMPLE 4

Figure 9:
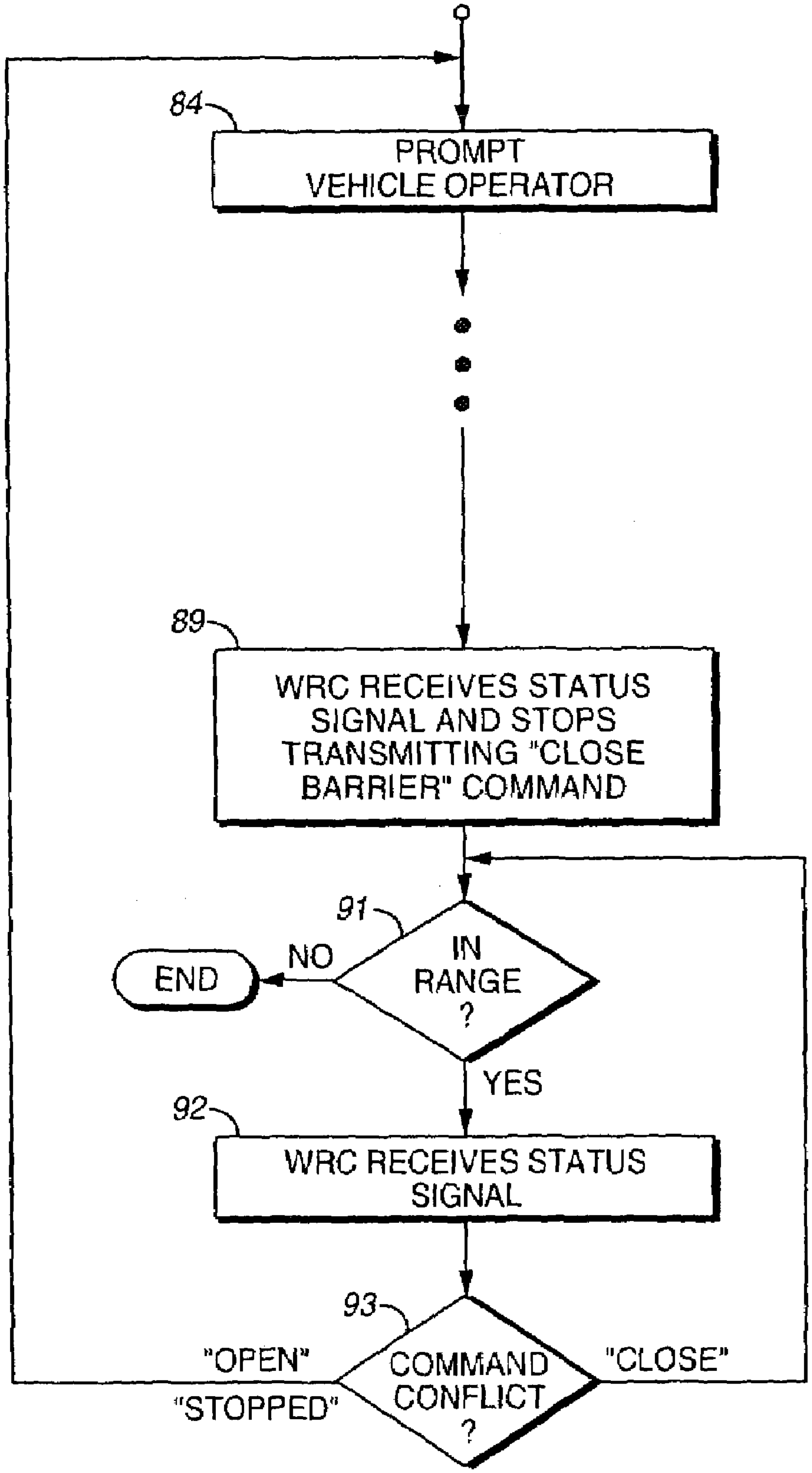
FIG. 9 depicts yet another illustrative example.

The process set forth in example 3 above can be further embellished. To illustrate, and referring now to FIG. 9, following transmission of the "close barrier" command, the wireless remote control apparatus can monitor 91 to determine whether it remains within reception range of the movable barrier operator's transmissions. When the vehicle eventually moves out of range, the process can conclude. In the meantime, however, the wireless remote control apparatus continues to receive 92 status signals as they are broadcast by the movable barrier operator. Upon receiving such a status signal after issuing a "close barrier" command and while still within range of the movable barrier operator, the wireless remote control apparatus can determine 93 whether a substantive conflict exists as between the transmitted command and the present operating status of the movable barrier operator. When such a conflict exists (for example, the operational status has reverted back to an indication that the movable barrier is in an opened position following issuance of a "close barrier" command), the wireless remote control apparatus can take an appropriate action. For example, the process can revert to earlier steps and provide an appropriate prompt 84 to the vehicle operator and await further instructions therefrom.

Numerous benefits and advantages flow through provision of these various embodiments. Without making any particular alterations to the processing or control strategy of the movable barrier operator (aside from equipping the movable barrier operator with the ability to transmit status messages regarding its own operational status) the overall system control strategy can be significantly extended and enriched. Old features can be implemented in new ways, at least some of which may be more efficient or effective when controlled from the standpoint of the wireless remote control apparatus. And new features, not presently supported or even, in some cases, not considered possible, can be supported. These benefits can be attained in a reasonably cost efficient manner and typically with increased rather than compromised operational safety.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, these teaching could be used in combination with global positioning system receivers or other location determination platforms such that a wireless remote control apparatus could have the benefit of more precise location information to thereby better inform its actions and responses. To illustrate, and referring again to FIG. 3, the controller 31 of the wireless remote control apparatus 14 can operably couple to a location determination unit 37 such as a dead reckoning-based platform or a global positioning system receiver as are well understood in the art. As an alternative, the controller 31 can couple to a local wireless interface 38 (such as, for example, a Bluetooth-compatible wireless 10 transceiver as is well understood in the art). So configured, the controller 31 could receive location information from, for example, a location determination unit 39 located elsewhere in the vehicle (provided, of course, that the remote located location determination unit 39 has a compatible transceiver capability to permit such communications). With such information, at a minimum, the controller 31 could effect the processes described above with an appropriate substitution (or supplementation) of this location information for the previously mentioned relative distance information.

I claim:

1. A method for use with a movable barrier operator comprising:

automatically wirelessly transmitting a status signal regarding at least a first movable barrier operator operating state, wherein the status signal of the movable barrier operator further includes a substantially unique identifier that corresponds to an intended recipient device that is the movable barrier operator;

receiving a wireless remote control signal;

automatically taking a predetermined action in response to the remote control signal to thereby effect a change to a corresponding movable barrier operator operating state.

2. The method of claim 1 wherein automatically wirelessly transmitting a status signal regarding at least a first movable barrier operator operating state includes automatically wirelessly transmitting a status signal regarding a current position of a movable barrier.

3. The method of claim 1 wherein automatically wirelessly transmitting a status signal further includes automatically wirelessly transmitting a signal that corresponds to a possible-obstacle detected status of the movable barrier operator.

4. The method of claim 3 wherein automatically wirelessly transmitting a status signal that corresponds to a possible-obstacle detected status of the movable barrier operator includes automatically wirelessly transmitting a status signal that corresponds to a broken-photobeam detected status of the movable barrier operator.

5. The method of claim 1 wherein receiving a wireless remote control signal includes processing the remote control signal to determine whether the remote control signal includes an identifier that corresponds to the movable barrier operator.

6. The method of claim 5 wherein processing the remote control signal to determine whether the remote control signal includes an identifier that corresponds to the movable barrier operator includes not automatically taking the predetermined action when the remote control signal does not include the identifier.

7. The method of claim 5 wherein processing the remote control signal to determine whether the remote control signal includes an identifier that corresponds to the movable barrier operator includes automatically taking the predetermined action when the remote control signal includes the identifier.

8. The method of claim 1 wherein automatically taking a predetermined action in response to the remote control signal to thereby effect a change to a corresponding movable barrier operator operating state includes automatically changing a position of a movable barrier.

9. The method of claim 1 and further comprising automatically wirelessly transmitting a status signal regarding at least the change to the corresponding movable barrier operator operating state.

10. The method of claim 9 wherein automatically wirelessly transmitting a status signal regarding at least the change to the corresponding movable barrier operator operating state includes automatically wirelessly transmitting a status signal that includes an identifier that corresponds to the movable barrier operator.

11. The method of claim 1 wherein the wireless remote control signal based on the at least a first movable barrier operator operating state from the status signal.

12. A method comprising:

at a movable barrier operator:

automatically wirelessly transmitting a status signal regarding at least a first movable barrier operator operating state;

at a wireless remote control apparatus:

receiving the status signal;

determining whether the status signal includes an identifier that corresponds to a predetermined movable barrier operator, wherein the status signal is not responded to when the status signal does not include the identifier;

transmitting a wireless remote control signal;

at the movable barrier operator:

receiving the wireless remote control signal;

automatically taking a predetermined action in response to the remote control signal to thereby effect a change to a corresponding movable barrier operator operating state.

13. The method of claim 12 and further comprising, at the wireless remote control apparatus and subsequent to receiving the status message, providing a human-discernable prompt.

14. The method of claim 13 wherein providing a human-discernable prompt includes providing an audible prompt.

15. The method of claim 14 wherein providing an audible prompt includes providing at least an audible tone.

16. The method of claim 14 wherein providing an audible prompt includes providing a voiced message.

17. The method of claim 13 wherein providing a human-discernable prompt includes providing a human-discernable prompt that provides information regarding the first movable barrier operator operating state.

18. The method of claim 13 and further comprising, at the wireless remote control apparatus and subsequent to providing the human-discernable prompt, receiving an instruction from a user.

19. The method of claim 18 wherein receiving an instruction from a user includes detecting the user's manipulation of a user interface.

20. The method of claim 18 wherein receiving an instruction from a user includes recognizing the user's speech.

21. The method of claim 20 wherein recognizing the user's speech includes using a speaker-independent speech recognition process to recognize the user's speech.

22. The method of claim 20 wherein recognizing the user's speech includes using a speaker-dependent speech recognition process to recognize the user's speech.

23. The method of claim 12 and further comprising, at the wireless remote control apparatus and subsequent to receiving the status message, providing a visual indication.

24. The method of claim 23 wherein providing a visual indication includes providing a visual indication that represents a present status of the movable barrier operator as corresponds to status signal.

25. The method of claim 12 wherein:

receiving the status signal includes determining whether a predetermined command has been associated with the status signal;

and when a predetermined command has been associated with the status signal:

transmitting a wireless remote control signal automatically includes transmitting a wireless remote control signal that corresponds to the predetermined command.

26. The method of claim 25, wherein when a predetermined command has not been associated with the status signal, at the wireless remote control apparatus and subsequent to receiving the status message, providing a human-discernable prompt.

27. The method of claim 26 and further comprising, at the wireless remote control apparatus and subsequent to providing the human-discernable prompt, receiving an instruction from a user.

28. The method of claim 12 wherein transmitting a wireless remote control signal includes:

receiving an instruction from a user;

determining whether the instruction conflicts with content of the status signal;

determining not to transmit the wireless remote control signal when the instruction does conflict with the content of the status signal.

29. The method of claim 28 wherein determining whether the instruction conflicts with content of the status signal includes determining whether the instruction comprises an instruction to cause movement of a movable barrier along a path of travel and the status signal includes content indicating that the movable barrier operator has detected an obstacle in the path of travel.

30. The method of claim 12 and further comprising:

at the wireless remote control apparatus:

using the status signal to determine proximity of the wireless remote control apparatus to the movable barrier operator;

and wherein transmitting a wireless remote control signal includes automatically transmitting a wireless remote control signal that includes information regarding the proximity of the wireless remote control apparatus to the movable barrier operator.

31. The method of claim 12 wherein the wireless remote control signal based on the at least a first movable barrier operator operating state from the status signal.

32. A method for use with a movable barrier operator remote control apparatus, comprising:

receiving a wireless transmission comprising a status signal regarding at least a first movable barrier operator operating state;

in response to receiving the status signal, automatically making a corresponding predetermined response;

assessing a parameter that corresponds to a likely distance between the remote control apparatus and a source of the status signal;

taking a first course of action when the parameter is at least less than a predetermined value;

taking a second course of action when the parameter at least exceeds the predetermined value.

33. The method of claim 32 wherein automatically making a corresponding predetermined response includes automatically transmitting a remote control movable barrier operator operating state alteration instruction.

34. The method of claim 33 wherein automatically making a corresponding predetermined response further includes automatically disassociating the alteration instruction from the status signal subsequent to automatically transmitting the remote control movable barrier operator operating state alteration instruction.

35. The method of claim 33 wherein automatically making a corresponding predetermined response includes determining that a predetermined operating state alteration instruction has been previously associated with the status signal.

36. The method of claim 35 and further comprising, when no predetermined operating state alteration instruction has been previously associated with the status signal, providing a human-discernable prompt.

37. The method of claim 36 and further comprising receiving a user response to the human-discernable prompt.

38. The method of claim 37 and further comprising transmitting a remote control movable barrier operator operating state alteration instruction that corresponds to the user response.

39. The method of claim 37 wherein receiving a user response includes automatically recognizing a spoken user response.

40. The method of claim 32 wherein automatically making a corresponding predetermined response includes automatically providing a prompt to a proximally located user when the likely distance between the remote control apparatus and the source of the status signal at least exceeds a predetermined distance.

41. The method of claim 40 wherein providing a prompt includes providing an audible prompt.

42. The method of claim 41 wherein providing an audible prompt includes providing a voice message.

43. The method of claim 32 wherein assessing a parameter that corresponds to a likely distance between the remote control apparatus and a source of the status signal includes measuring signal strength of the status signal.

44. The method of claim 32 wherein assessing a parameter that corresponds to a likely distance between the remote control apparatus and a source of the status signal includes measuring bit error rate of the status signal.

45. The method of claim 32 wherein taking a first course of action includes making no automatic transmissions.

46. The method of claim 32 wherein taking a second course of action includes making no automatic transmissions and providing a human-discernable prompt.

47. The method of claim 46 wherein providing a human-discernable prompt includes providing a verbal message.

48. The method of claim 46 and further comprising, subsequent to providing a human-discernable prompt, receiving a user instruction.

49. The method of claim 48 and further comprising transmitting a remote control signal that corresponds to the user instruction.

50. The method of claim 32 wherein assessing a parameter that corresponds to a likely distance between the remote control apparatus and a source of the status signal includes providing location information that pertains at least to the remote control apparatus.

51. A method for use with a movable barrier operator remote control apparatus, comprising:

receiving a wireless transmission comprising a status signal regarding at least a first movable barrier operator operating state;

in response to receiving the status signal, automatically making a corresponding predetermined response;

receiving an instruction from a user;

determining whether the instruction conflicts with content of the status signal;

determining not to transmit a wireless remote control signal that corresponds to the instruction when the instruction does conflict with the content of the status signal.

52. The method of claim 51 wherein determining whether the instruction conflicts with content of the status signal includes determining whether the instruction comprises an instruction to cause movement of a movable barrier along a path of travel and the status signal includes content indicating that the movable barrier operator has detected an obstacle in the path of travel.

53. The method of claim 51 wherein automatically making a corresponding predetermined response includes automatically transmitting a remote control movable barrier operator operating state alteration instruction.

54. The method of claim 53 wherein automatically making a corresponding predetermined response further includes automatically disassociating the alteration instruction from the status signal subsequent to automatically transmitting the remote control movable barrier operator operating state alteration instruction.

55. The method of claim 53 wherein automatically making a corresponding predetermined response includes determining that a predetermined operating state alteration instruction has been previously associated with the status signal.

56. The method of claim 55 and further comprising, when no predetermined operating state alteration instruction has been previously associated with the status signal, providing a human-discernable prompt.

57. The method of claim 56 and further comprising receiving a user response to the human-discernable prompt.

58. The method of claim 57 and further comprising transmitting a remote control movable baffler operator operating state alteration instruction that corresponds to the user response.

59. The method of claim 57 wherein receiving a user response includes automatically recognizing a spoken user response.

60. A movable barrier operator remote control apparatus comprising:

a wireless movable barrier operator status condition signal receiver;

a human-discernable prompt that is operably coupled to the receiver and that is responsive to reception of at least a first movable barrier operator status condition signal;

a user input interface;

a remote control movable barrier operator command signal transmitter that is responsive to the user input interface;

a stored plurality of remote control movable barrier operator commands that are operably coupled to the user input interface and the transmitter;

a signal strength tester that is operably coupled to the receiver and to the stored plurality of remote control movable barrier operator commands, such that at least a first command can be automatically selected when signal strength of a received signal is less than a predetermined amount.

61. A movable barrier operator remote control apparatus comprising:

a wireless movable barrier operator status condition signal receiver;

a human-discernable prompt that is operably coupled to the receiver and that is responsive to reception of at least a first movable barrier operator status condition signal;

a user input interface;

a remote control movable barrier operator command signal transmitter that is responsive to the user input interface;

a stored plurality of remote control movable barrier operator commands that are operably coupled to the user input interface and the transmitter;

a signal strength tester that is operably coupled to the receiver and to the stored plurality of remote control movable barrier operator commands, such that at least a first command can be automatically selected when signal strength of a received signal is greater than a predetermined amount.

62. The movable baffler operator remote control apparatus of claim 61 and further comprising a stored plurality of remote control movable barrier operator commands that are operably coupled to the user input interface and the transmitter.

63. The movable barrier operator remote control apparatus of claim 60 wherein the user input interface includes a speech recognition platform.

64. A movable barrier operator remote control apparatus comprising:

a wireless movable barrier operator status condition signal receiver;

a human-discernable prompt that is operably coupled to the receiver and that is responsive to reception of at least a first movable barrier operator status condition signal;

a user input interface;

a remote control movable barrier operator command signal transmitter that is responsive to the user input interface;

controller means for automatically activating the human-discernable prompt in response to receiving a predetermined movable barrier operator status condition signal, wherein the controller means further determines whether a previously selected remote control command has been associated with a given movable barrier operator status condition signal and for automatically causing transmission of that previously selected remote control command upon receiving the given movable barrier operator status condition signal.

65. The movable barrier operator remote control apparatus of claim 64 and further comprising a stored plurality of remote control movable barrier operator commands that are operably coupled to the user input interface and the transmitter.

66. The movable barrier operator remote control apparatus of claim 64 and further comprising a stored plurality of remote control movable barrier operator commands that are operably coupled to the user input interface and the transmitter.

67. A method for use with a movable barrier operator remote control apparatus, comprising:

monitoring reception of a wireless transmission comprising a status signal regarding at least a first movable barrier operator operating state;

using the status signal to determine a likely distance between the movable barrier operator remote control apparatus and a movable barrier operator that transmits the status signal;

receiving a user command via a movable barrier operator remote control apparatus user interface;

when the movable barrier operator remote control apparatus is not within a predetermined likely distance of the movable barrier operator, storing the user command;

when at least within the predetermined likely distance of the movable barrier operator, automatically transmitting to the movable barrier any previously stored user commands.

68. The method of claim 67 wherein using the status signal to determine a likely distance between the movable barrier operator remote control apparatus and the movable barrier operator includes determining a parameter that corresponds to received signal strength of the wireless transmission that comprises the status signal.

69. The method of claim 67 wherein storing the user command includes only storing the user command for no more than a limited period of time, such that the user command will be de-listed when the limited period of time expires and the movable barrier operator remote control apparatus has not been within the predetermined likely distance of the movable barrier operator.

70. The method of claim 69 wherein storing the user command for no more than a limited period of time includes storing the user command for no more than a predetermined period of time.

71. The method of claim 69 wherein de-listing the user command includes removing the user command from storage.

* * * * *

UNITED STATES PATENT AND TRADEMARK OFFICE

CERTIFICATE OF CORRECTION

PATENT NO. : 7,071,813 B2
APPLICATION NO. : 10/447661
DATED : July 4, 2006
INVENTOR(S) : James J. Fitzgibbon It is certified that error appears in the above-identified patent and that said Letters Patent is hereby corrected as shown below:

In Claim 6, Col. 11, line 59, delete "a signal" and insert -- a status signal --;

In Claim 78, Col. 15, line 60, delete "baffler" and insert -- barrier --; and

In Claim 80, Col. 16, line 41, delete "baffler" and insert --barrier --.

Signed and Sealed this

Sixth Day of March, 2007

JON W. DUDAS
*Director of the United States Patent and Trademark Office*